US 6,711,719 B2

(12) United States Patent
Cohn et al.

(10) Patent No.: US 6,711,719 B2
(45) Date of Patent: Mar. 23, 2004

(54) METHOD AND APPARATUS FOR REDUCING POWER CONSUMPTION IN VLSI CIRCUIT DESIGNS

(75) Inventors: John Maxwell Cohn, Richmond, VT (US); Alvar A. Dean, Groton, MA (US); Amir H. Farrahi, Peekskill, NY (US); David J. Hathaway, Underhill Center, VT (US); Thomas Michael Lepsic, Jeffersonville, VT (US); Patrick Edward Perry, Shelburne, VT (US); Scott A. Tetreault, Clinton, MA (US); Sebastian T. Ventrone, South Burlington, VT (US)

(73) Assignee: International Business Machines Corporation, Armonk, NY (US)

(*) Notice: Subject to any disclaimer, the term of this patent is extended or adjusted under 35 U.S.C. 154(b) by 162 days.

(21) Appl. No.: 09/928,573

(22) Filed: Aug. 13, 2001

(65) Prior Publication Data

US 2003/0033580 A1 Feb. 13, 2003

(51) Int. Cl.⁷ ................................. G06F 17/50
(52) U.S. Cl. ...................... 716/2; 716/4; 716/7; 716/10
(58) Field of Search ..................... 716/10, 8, 4, 7, 716/2

(56) References Cited

U.S. PATENT DOCUMENTS

| 4,894,558 A | 1/1990 | Conkle et al. ............... 326/114 |
| 5,414,379 A | 5/1995 | Kwon ......................... 327/170 |
| 5,526,497 A | 6/1996 | Zika et al. ................... 710/316 |

(List continued on next page.)

FOREIGN PATENT DOCUMENTS

| EP | 425951 A2 | * 5/1991 | .......... H03K/19/00 |
| JP | 61135223 A | * 6/1986 | .......... H03K/19/094 |
| JP | 03286560 A | * 12/1991 | .......... H01L/27/04 |
| JP | 05336655 A | * 12/1993 | .......... H02J/01/00 |
| JP | 06021802 A | * 1/1994 | .......... H03K/19/08 |
| JP | 06062573 A | * 3/1994 | .......... H02M/03/28 |
| JP | 09306193 A | * 11/1997 | .......... G11C/27/02 |
| JP | 10327065 A | * 12/1998 | .......... H03K/19/0175 |
| JP | 2000299632 A | * 10/2000 | .......... H03K/17/24 |
| JP | 2001223573 A | * 8/2001 | .......... H03K/19/0175 |
| WO | WO 8201795 A | * 5/1982 | .......... H03K/03/35 |

OTHER PUBLICATIONS

NN931085, "High Performance CMOS Off–Chip Driver Circuit with Minimal Switching Noise", IBM Technical Disclosure Bulletin, vol. 36, No. 10, Oct. 1993, pp. 85–88 (6 pages).*
NN76122616, "Clock Driver for Integrated Circuit Loads", IBM Technical Disclosure Bulletin, vol. 19, No. 7, Dec. 1976, pp. 2616–2617 (4 pages).*
Golshan et al., "A novel reduced swing CMOS bus interface circuit for high speed low power VLSI systems", 19994 IEEE International Symposium on Circuits and Systems, vol. 4, May 30, 1994, pp. 351–354.*

(List continued on next page.)

Primary Examiner—Matthew Smith
Assistant Examiner—Phallaka Kik
(74) Attorney, Agent, or Firm—Connolly Bove Lodge & Hutz LLP

(57) ABSTRACT

In integrated circuit (IC) designs, a component of power consumed may be represented as Power=½ $FCV^2$, where C is the load capacitance being driven by a source cell, F is the switching frequency of the source cell, and V is the total output voltage swing. However, not every signal value generated by a source cell is required to propagate to all the sink cells connected to the source for every clock cycle of a chip. Accordingly, an isolate cell is inserted in a net (wire) connecting a source cell to at least one sink cell, to de-couple the at least one sink cell and a portion of the net from the source cell when a signal output by the source need not propagate. Due to the de-coupling, the load capacitance associated with the at least one sink and net portion is not experienced by the source cell for such signals. Accordingly, overall IC power consumption is reduced.

19 Claims, 10 Drawing Sheets

U.S. PATENT DOCUMENTS

| | | | | |
|---|---|---|---|---|
| 5,548,229 | A | | 8/1996 | Segawa et al. ............... 326/57 |
| 5,592,104 | A | | 1/1997 | Bach .......................... 326/27 |
| 5,602,783 | A | | 2/1997 | Ong ........................ 365/189.05 |
| 5,627,492 | A | | 5/1997 | Weaver et al. .............. 327/544 |
| 5,787,011 | A | * | 7/1998 | Ko ............................... 716/2 |
| 5,787,033 | A | | 7/1998 | Maeno ...................... 365/182 |
| 5,799,170 | A | * | 8/1998 | Drumm et al. ................ 716/2 |
| 5,864,244 | A | | 1/1999 | Kaplinsky ................... 328/58 |
| 5,892,687 | A | | 4/1999 | Moricz et al. ................ 716/18 |
| 5,963,728 | A | * | 10/1999 | Hathaway et al. ............ 716/3 |
| 5,986,471 | A | | 11/1999 | Britton et al. ................ 326/57 |
| 6,009,248 | A | * | 12/1999 | Sato et al. ..................... 716/2 |
| 6,034,553 | A | | 3/2000 | Kwong ........................ 326/86 |
| 6,038,381 | A | * | 3/2000 | Munch et al. ................ 716/1 |
| 6,038,386 | A | * | 3/2000 | Jain ............................ 716/16 |
| 6,072,333 | A | | 6/2000 | Tsukagoshi et al. .......... 326/58 |
| 6,074,428 | A | | 6/2000 | Petler .......................... 712/2 |
| 6,151,568 | A | * | 11/2000 | Allen et al. ................... 703/14 |
| 6,175,952 | B1 | * | 1/2001 | Patel et al. ................... 716/18 |
| 6,237,132 | B1 | * | 5/2001 | Dean et al. ................... 716/18 |
| 6,262,605 | B1 | * | 7/2001 | Ku ............................. 327/108 |
| 6,292,931 | B1 | * | 9/2001 | Dupenloup ................. 716/18 |
| 6,311,313 | B1 | * | 10/2001 | Camporese et al. ........... 716/6 |
| 6,314,549 | B1 | * | 11/2001 | Shau .......................... 716/16 |
| 6,324,678 | B1 | * | 11/2001 | Dangelo et al. .............. 716/18 |
| 6,385,565 | B1 | * | 5/2002 | Anderson et al. ............. 703/18 |
| 6,434,704 | B1 | * | 8/2002 | Dean et al. ................. 713/320 |
| 6,487,702 | B2 | * | 11/2002 | Lin et al. ....................... 716/4 |
| 6,493,863 | B1 | * | 12/2002 | Hamada et al. ............... 716/18 |
| 6,510,541 | B1 | * | 1/2003 | Fujiwara et al. ................ 716/5 |
| 6,532,439 | B2 | * | 3/2003 | Anderson et al. ............. 703/14 |
| 2001/0014963 | A1 | * | 8/2001 | Ando et al. ..................... 716/1 |
| 2002/0144217 | A1 | * | 10/2002 | Lin et al. ....................... 716/4 |
| 2002/0188921 | A1 | * | 12/2002 | Shau .......................... 716/16 |

OTHER PUBLICATIONS

NN85112742, "Multiplexed address Selection Circuitry with Minimum Row–to–Column Delay", IBM Technical Disclosure Bullentin, vol. 28, No. 6, Nov. 1985, pp. 2742–2743 (4 pages).*

NA80013426, "Merged Transistor Logic Circuit With Improved Power and Performance", IBM Technical Disclosure Bullentin, vol. 22, No. 8A, Jan. 1980, pp. 3426–3428 (5 pages).*

NN9204397, "Circuit Scheme to Bias OCD Output Stage N–Well", IBM Technical Disclosure Bulletin, vol. 34, No. 11, Apr. 1992, pp. 397–400 (6 pages).*

Wilm Donath, et al., "Tranformational Placement and Synthesis, " *Proceedings of the Design, Automation and Test in Europe*, pp. 194–201, Mar. 27, 2000.

Shervin Hojat and Paul Villarrubia, "An Integrated Placement and Synthesis Approach for Timing Closure of PowerPC™ Microprocessors," Proceedings of the 1997 International Conference on Computer Design (ICCD '97), pp. 206–210, Oct. 12, 1997.

* cited by examiner

METHOD AND APPARATUS FOR REDUCING POWER CONSUMPTION IN VLSI CIRCUIT DESIGNS

BACKGROUND OF THE INVENTION

The present invention relates to a method and apparatus for reducing power consumption in VLSI circuit designs. More particularly, the invention relates to a method and apparatus for causing a load capacitance connected to a source circuit in an IC (integrated circuit) design to be blocked or "isolated" from the source, given appropriate conditions, thereby reducing overall power consumption.

VLSI circuit designs, for example, CMOS ASICs (Application Specific Integrated Circuits) typically include source or driving cells connected to one or more driven or sink cells. The term "cell" as used herein refers to components of IC designs. In pre-fabrication stages, an IC design may be expressed in some form of digital data as an organization of standardized logic elements. Such standardized logic elements are commonly referred to as "cells" and are available from a number of vendors. The cells are typically stored as digital data in a library (and consequently are also sometimes called "books"). Examples of relatively low-level library cells include the standard Boolean circuits.

Cells may exist at different hierarchical levels. A plurality of cells may be organized into a higher-order structure which may also be identified as a cell; an example is an adder. A plurality of such higher-order structures may themselves be organized into a still-higher-order structure, and so on up to the highest or chip-level cell.

An IC design may also be referred to as an electrical "network" of interconnected cells, and accordingly connections between cells for propagating signals from one cell to another are often referred to as "nets." In the early design stages of the IC, when the IC is typically represented in software for ease of testing and debugging, a net is a logical connection. During later design stages, when physical placement of the cells on the IC is known (physical implementation phase), the net is digitally represented as a physical connection. When the IC is fabricated, a net becomes a physical connection via some conductive medium, and a cell becomes a physical circuit. Accordingly, a capacitive load is experienced by a source cell connected via a net or plurality of nets to driven or sink cells. Nets may also be referred to as "wires" or the "wiring" of the IC.

It may further be appreciated that whether a cell is referred to as a "source" or driving cell, or a "sink" or driven cell depends on the perspective within the network from which the cell is viewed. A cell may be a source cell with respect to "downstream" cells; i.e., cells that it drives or to which it propagates a logic signal; and a sink cell with respect to "upstream" cells; i.e., cells by which it is driven or which propagate logic signals to it.

Source and sink cells are constituents of "logic cones." The term "logic cone" refers to a grouping of cells involved in performing some logical function of the IC design. A logic cone may be determined with respect to an individual cell by identifying every downstream cell whose logic state it could influence; thus, the term "cone" is descriptive of a typically fan-like pattern that may be observed as downstream sink cells affected by a given source cell are traced out. The logic cone terminates at one or more observable points, i.e., for example, a clocked latch or a primary output of the function supported by the logic cone. A primary output could be, for example, an output pin of a chip housing the design.

In IC designs as described above, a component of power consumed may be represented as Power=½ $FCV^2$, where C is the load capacitance being driven by a source cell, F is the switching frequency of the source cell, and V is the total output voltage swing. On large CMOS VLSI chips, for example, capacitance from wiring interconnect can be a significant portion of the capacitive load being driven by the source cell.

However, not every signal value generated by a source cell on a net is required to propagate to all the sink cells connected to the net for every clock cycle of a chip. Sections of logic (multiple cones) can be turned off by having the clock or data associated with their latches forced to be inactive, this is commonly referred to as putting the logic in sleep mode. Due to the Boolean function of the cells contained within the logic cone signal propagation could be blocked before it reaches a storage element ("latch") or other observable output of the chip if the downstream logic's Boolean function prevents the signal from propagating. The signal causes no observable result.

As another example of a case when a signal causes no observable result, consider a source cell which drives one input of a two-input OR gate, where it is known that the other of the inputs to the OR gate is high. In such a case, it does not matter what the input driven by the source cell is, since the output of the OR gate will be high regardless of this input.

In view of the above, a method and apparatus are needed for realizing a reduction in power consumed by the propagation of signals which cause no observable result.

SUMMARY OF THE INVENTION

In a method and apparatus according to the present invention, a reduction in power expenditure is achieved by isolating source cells from the load capacitance of a downstream sink cell or cells when a signal output by the source cell will cause no observable results, and therefore need not be propagated to the downstream sink cell or cells.

According to one embodiment, an "isolate" cell is introduced into an IC design for selected source cells. The isolate cell is placed in a net connecting a selected source cell and at least one sink cell, between the selected source cell and at least one sink cell. The isolate cell is controlled by an isolate function to isolate the source cell from a portion of the net and the at least one sink cell when a signal generated by the source cell will cause no observable downstream results. By isolating the source cell from the net portion and at least one sink cell, the load capacitance of the net portion and at least one sink cell is not experienced by the source cell, thereby reducing the "C" factor in the above expression for power consumed by a network.

DETAILED DESCRIPTION OF THE INVENTION

In the electrical networks of IC designs, there are typically cells that set the logic state of given nets; for digital logic, the state is typically either high or low. Such cells may be referred as source or driving cells. A source cell is connected via a net to at least one driven or sink cell, or via a plurality of nets to a plurality of sink cells. The sink cell or cells receive a logic signal based on the state set on the net connecting the sink cells to the source cell.

In this disclosure, signals as described above, i.e., that cause no observable result, are referred to as "non-observable" signals.

Accordingly, the present invention relates to inserting an isolate cell between a source cell which generates non-observable signals, and a downstream sink cell or plurality of sink cells. The isolate cell is controlled by a signal generated by an isolate function, to isolate the source cell from a portion of the net and downstream sink cells when the signal generated by the source cell is a non-observable signal. The load capacitance seen by the source cell is thereby eliminated and a reduction in power expenditure is consequently realized.

The isolate cell may perform the de-coupling of the source cell from the sink cell by inserting a high impedance between the source cell and the sink cells. A hold function may also be implemented by the isolate cell, to hold the previous logic state of the net during an isolation period, as described in greater detail below.

Figure 1:
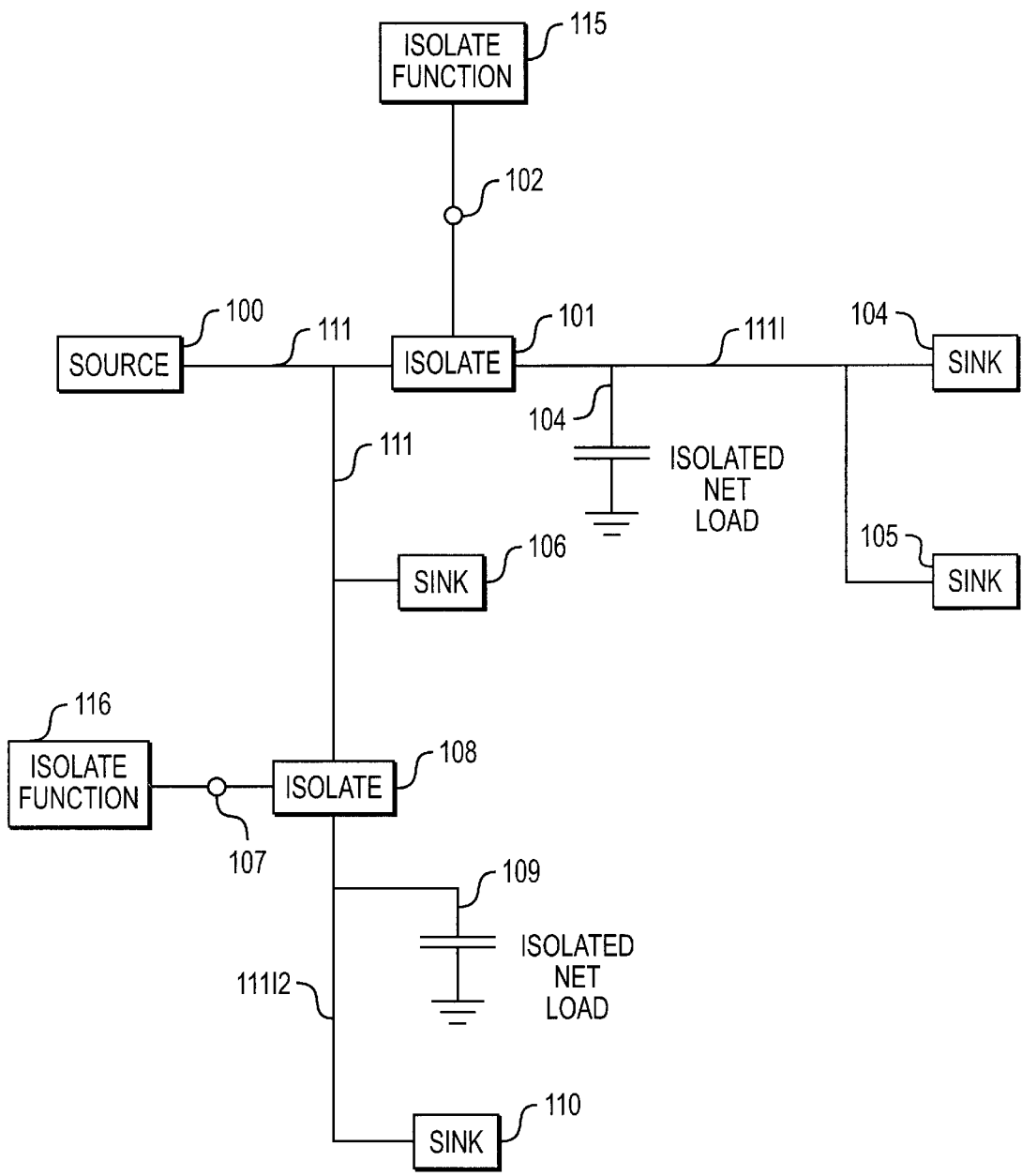
FIG. 1 shows a portion of an IC design including isolate cells and isolate functions according to the present invention.

FIG. 1 illustrates one possible embodiment of a circuit according to the invention. A source cell 100 is connected via a net 111 to an isolate cell 101 controlled by an isolate function 115 via a gate signal/net 102. The isolate cell 101 is further connected to a sink cell 104 and a sink cell 105 via a net portion 111I. A capacitive load 103 is experienced by the source cell 100 when propagating a signal to sinks 104 or 105 along nets 111 and 111I. The source cell 100 is further connected via a net 111 to a sink cell 106 and an isolate cell 108 connected to a gate signal/net 107 controlled by an isolate function 116. The isolate cell 108 is further connected to a sink cell 110 via a net portion 111I2. The source cell 100 experiences a capacitive load 109 when propagating a signal along nets 111 and 111I2 to sink cell 110.

According to the invention, the isolate cells 101 and 108 de-couple the source cell 100 from net portion 111I and sinks cells 104 and 105, or net portion 111I2 and sink 110, when a signal generated by the source cell is a non-observable signal. The isolate cells may be controlled by isolate functions such as 115 and 116, which trigger the isolate cells to perform isolation for non-observable signals.

It may be noted in FIG. 1 that nets connecting the source 100 to sinks 104, 105 and 110 are long relative to the net connecting source 100 to sink 106. Therefore, sinks 104, 105 and 110 and their associated nets place a greater capacitive load on source 100 than does sink 106 and its associated net. Accordingly, isolate cells have been placed between source 100 and sinks 104, 105 and 110, but no isolate cell has been placed between source 100 and sink 106.

Thus, FIG. 1 illustrates at least one consideration involved in identifying and selecting those nets in which isolate circuits should be placed, namely, the length of the net and its corresponding capacitive load. Because the additional circuitry of the isolate cells contributes its own overhead to a logic design, in area, circuit delay, and power usage, the isolate cells must be placed in appropriate locations in order to realize a reduction in power expenditure. If nets are too short, addition of isolation logic will nullify or even negate any benefit, because the power consumption of the isolation logic will be equal to or greater than the power usage reduction gained by load isolation. Additionally, logical, physical and timing considerations must be applied to a logic design to determine which cells are good candidates for load isolation.

For example, for a given cell to be a suitable candidate for isolation, the signals it generates should be non-observable a significant percentage of time (i.e., for a significant number of clock cycles during normal IC operation. Put in other terms, the logic cone fed by the cell should be independent of the state of the net connecting it to the cell a significant portion of the time.

Candidate cells can be identified by determining the probability that the logic cone outputs will be unaffected, or equivalently, the fraction of the time that logic cone outputs will be unaffected by the cell. This probability can be determined using simulation or other well-known methods for determining signal probabilities.

More particularly, an isolate function, as mentioned above, for a particular cell may be determined, and the probability of the isolate function having a logic "true" value may be determined. An isolate function with a high probability of having a logic "true" state identifies a cell which is a good candidate for load isolation.

The isolate function may be a complete function which determines, for all possible logic combinations, when the output of a particular cell is not observable. Alternatively, the isolate function may be only a subset of all possible logic combinations for which the output of the cell is not observable. This is because, depending upon the complexity of the logic required to implement the complete isolate function, it could be more practical to implement only a subset of the isolate function, while still realizing the advantages of the invention.

In an embodiment, an isolate function may be implemented by connecting, to the isolate cell, signals corresponding to those logic combinations for which the source cell outputs a non-observable signal. The signals may be obtained from other cells of the IC, in logic related to the source cell being isolated. Combinations of logic states of the cells in the related logic cause the signal output by the source cell to be non-observable. Additional isolation logic cells may need to be added in order to generate the logic combinations.

Figure 2A:
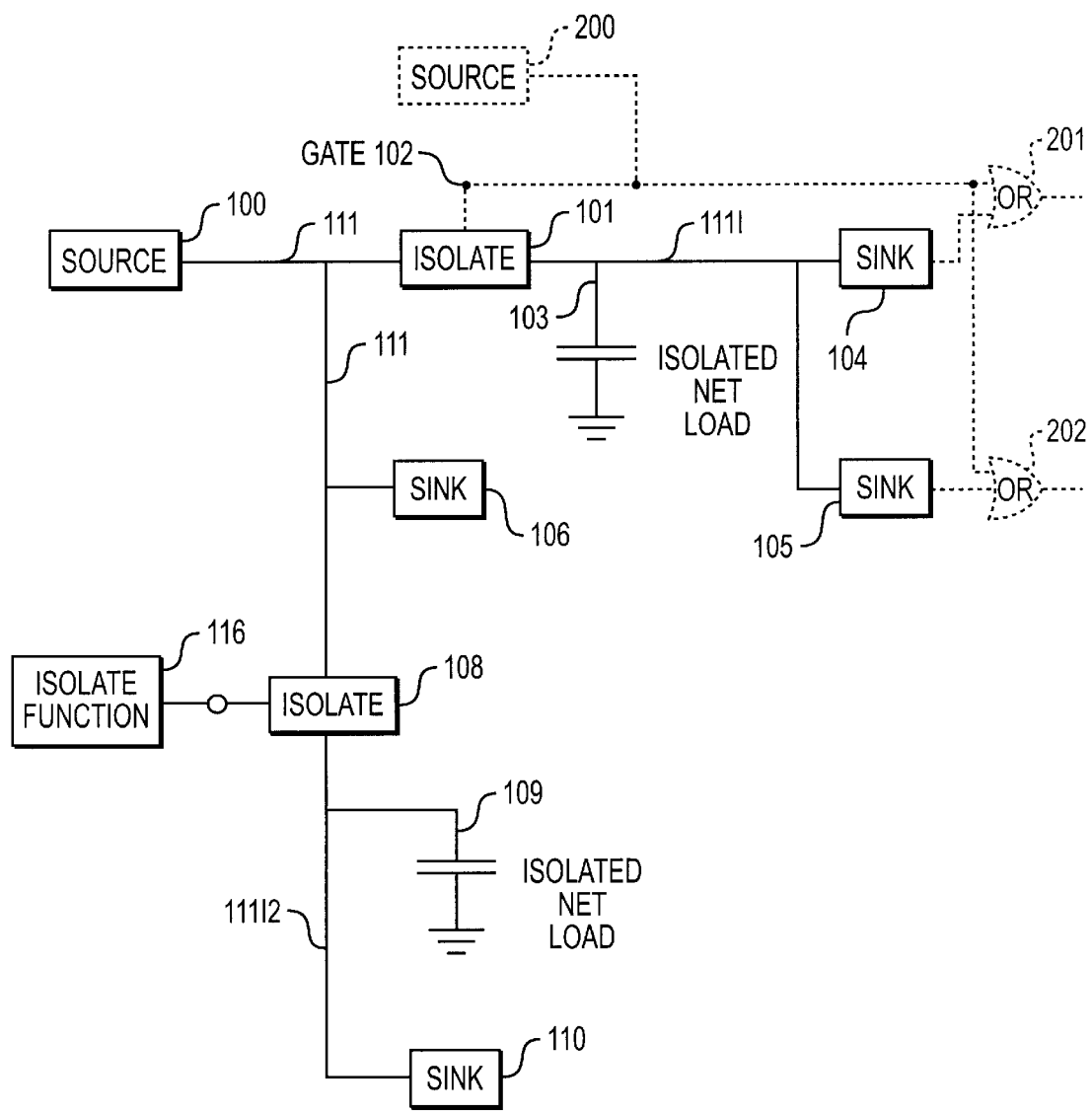
FIGS. 2A and 2B show detailed examples of isolate functions.

FIG. 2A shows an example of one possible isolate function for isolating source cell 100. Logic involved in the isolate function is shown in broken lines. The isolate function is determined by logical interconnections between downstream sink cells 104 and 105, OR gates 201 and 202, and source cell 200. Because OR gates 201 and 202 will have a logic "true" output when source 200 has a logic "true" value, regardless of the values of sinks 104 and 105, a signal from source 100 need not propagate to sinks 104 and 105 when source 200 is "true". (Herein, typically of most digital systems, logic "true" is the equivalent of logic "1", represented by a high-going signal. Logic "false" is the equivalent of logic "0", represented by a low-going signal.) Accordingly, when source 200 is "true", source 100 outputs a non-observable signal and can be isolated from net portion 111I and sinks 104 and 105 to obtain a reduction in power expenditure.

Thus, an isolate function I for controlling isolate cell 101, for the example circuit shown in FIG. 2, is the relatively simple one of I=source 200; i.e., when source 200 is "true", I is "true" and causes isolation to take place. The isolate function is implemented by the connection between source 200 and gate 102.

An example of a slightly more complicated isolate function than the one shown in FIG. 2A would be if the isolate cell 101 was enabled (i.e., activated so as to cause isolation) on a low-going signal. In such a case, an inverter would need to be inserted between the source 200 and the gate 102, and the isolate function I would be I=NOT(source 200).

Figure 2B:
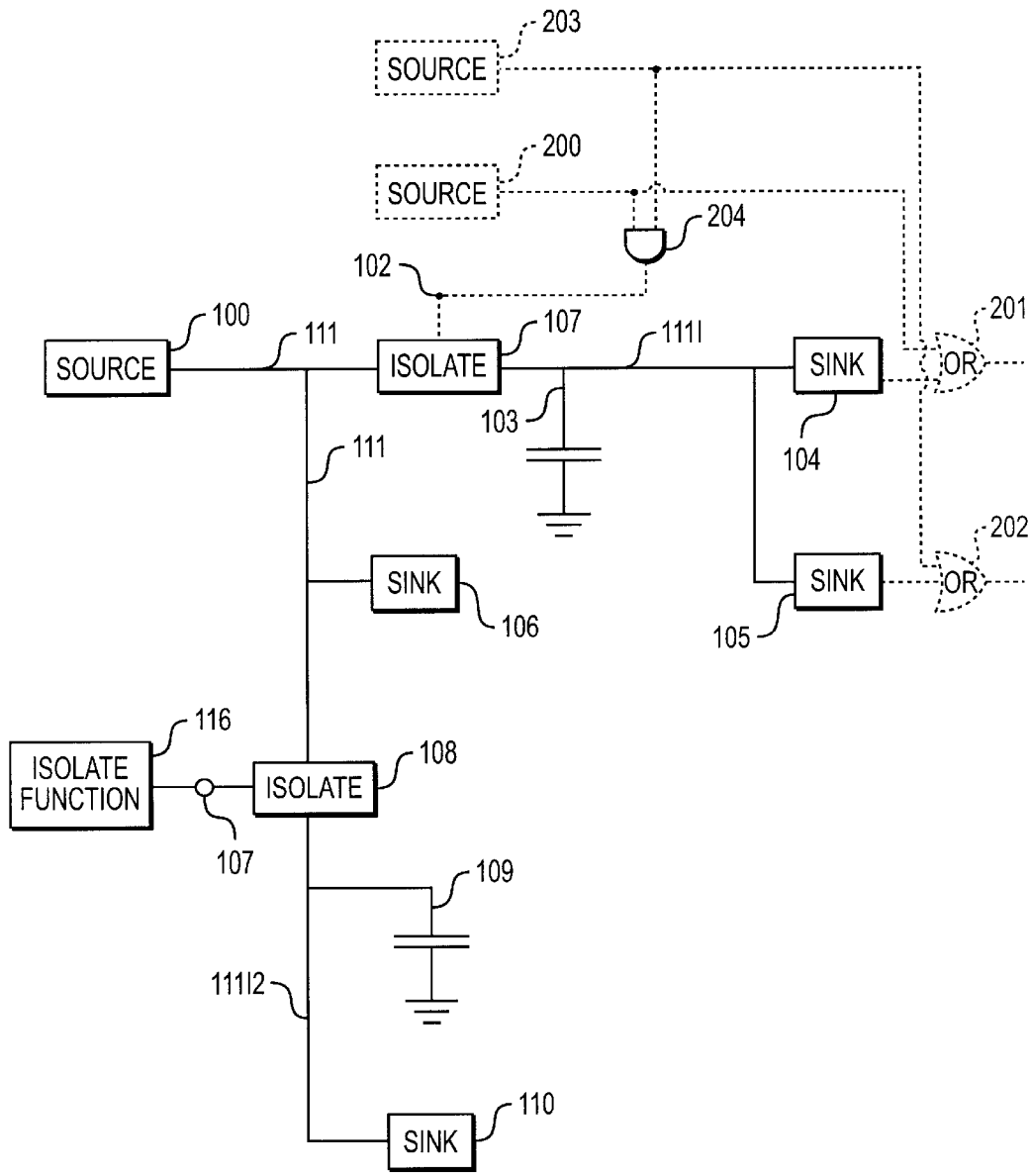

An example of a still more complicated isolate function is shown in FIG. 2B. In FIG. 2B, another source cell 203 has been added to the circuit of FIG. 2A, and rather than source 200 being input to both OR gates 201 and 202, source 200 is input to OR gate 201, while source 203 is input to OR gate 202. Accordingly, if either source 200 or 203 has a logic "0" value, the signal output by source 100 is not a non-observable signal, but if both source 200 and 203 have a logic "1" value, it does not matter what signal is output by source 100, because the outputs of OR gates 201 and 202 will be logic "1" regardless of the values output by sinks 104 and 105. Accordingly, if both source 200 and source 203 have a logic "1" value, the signal output by source 100 is a non-observable signal, and isolate cell 107 can be activated to de-couple source 100 from its downstream capacitive load. Thus, an isolate function I would be I=(source 200) AND(source 203), which could be implemented by adding AND gate 204 and associated connections as shown in FIG. 2B.

For the relatively simple examples of FIGS. 2A and 2B, it has been assumed that the outputs of OR gates 201 and 202 are observable, and that accordingly, an isolate function can be determined in terms of the single stage of OR gates 201 and 202 and sources 200 and 203 shown. Clearly, isolate functions can be substantially more complex and be determined in terms of numbers of downstream stages. For example, referring to FIGS. 2A and 2B, an isolate function could depend on a third stage of the logic cone of sink 104, and a 50th stage of the logic cone of sink 105, or the like.

Known logic synthesis tools can be used to determine isolate functions. The logic synthesis tools are components in a methodology of IC design that is increasingly software-driven.

In general, IC development comprises a design phase and a physical implementation phase. The design phase has largely moved from a design by schematic entry approach to a software synthesis of Boolean equations approach. During the design phase, electronic circuits destined for eventual fabrication on a physical silicon device can be initially represented in software written in a Hardware Description Language (HDL), which can describe the function of a piece of hardware independently of the implementation. Some commonly used HDLs include Verilog and VHDL (VHSIC Hardware Description Language; "VHSIC" stands for "Very High Speed Integrated Circuit"). A software representation of a hardware design allows for significant speed, flexibility and ease of design development and testing.

An HDL program can describe the design of a complete digital system or a simple component of a system, such as a logic gate, at varying levels of abstraction. Generally, three major levels of abstraction are referred to in the art: a behavioral level, a structural or RTL (Register Transfer Language) level, and a logic gate level.

At the behavioral level, a design is described in terms of its function, rather than its structure or constituent parts. At the structural or RTL level, input/output relationships for a design are described in terms of dataflow operations on signal and register values. At the logic gate level, interconnections are specified between design elements at the logic gate level.

Logic synthesis in general refers to an automatic method of converting a higher level of abstraction to a lower level of abstraction. More particularly, it usually refers to converting HDL specifications at a behavioral or RTL level to a gate-level cell netlist.

Typically, a logic synthesis software tool takes as input a behavioral or RTL level HDL design specification, information on physical environment design constraints, and information from a cell library, and produces a netlist as output. The netlist is typically then input to a simulation software tool, which applies stimulus to the inputs of a design to determine whether it produces the correct output.

The present invention may utilize synthesis tools that implement a technique known as "placement-driven" synthesis, whereas past techniques applied timing-driven synthesis. Timing-driven synthesis uses a static wire-load model of a design, is based on the number of driven cells in a particular net and assumes a certain amount of wiring capacitance. Placement-driven synthesis is more sophisticated.

Placement-driven synthesis (PDS) tools both convert the HDL to gate level cells and place the cells. By "placing" the cells, it is meant that an IC design, or a portion of it, is finalized to a level where its constituent gates and wires, physical dimensions and location upon a target chip are reasonably well-determined (as opposed to simply describing function of the design in HDL, for example). Based on the placement, the amount of wiring load from the driving cells to the driven cells can be determined. This information can be used, among other purposes, for determining where to locate isolate cells.

More particularly, PDS may use a technique which partitions a space for containing an IC design into "bins." The space is recursively divided; first into two halves, then each half is divided in half, and so on. The regions into which the space is divided are called "bins." As each division occurs, placement information about the IC cells within the bins is refined.

Logic synthesis operations (generally any operations which modify the design netlist) are performed between divisions, allowing modifications to be made to the network based on refined knowledge of circuit placement as it becomes available. Typical synthesis operations include buffering, cloning (duplicating a circuit and distributing its fanout between the original circuit and the copy), factoring, pin swapping, etc. (occasionally circuits are also moved between bins).

For example, the PDS process may start with an RTL level definition of a design, comprising a set of Boolean logic equations. As the design space is divided into successively smaller bins, logic synthesis is applied to the design to reduce the RTL-level description to a cell-level netlist. The logic synthesis is followed by a placement recursion in order to meet design timing requirements, followed by another logic synthesis recursion, followed by a placement recursion, and so on.

Figure 3:
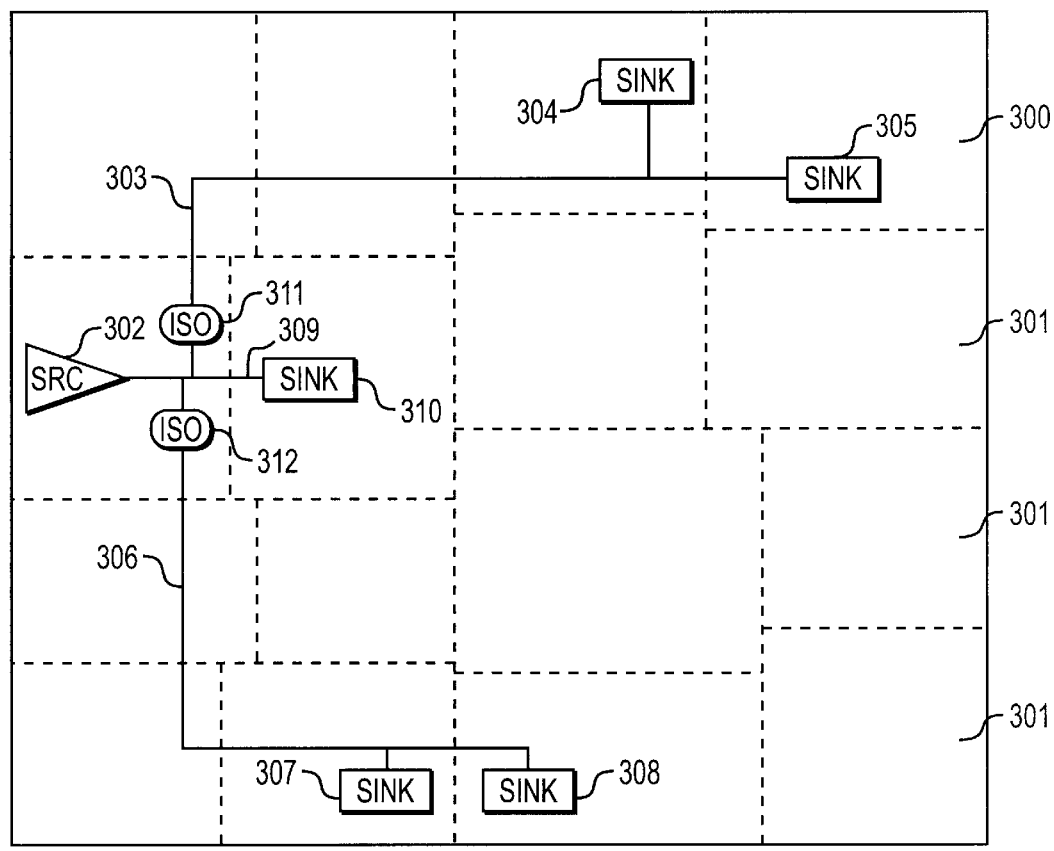
FIG. 3 shows a portion of an IC design space partitioned into "bins" according to an embodiment of the invention.

FIG. 3 shows an example of a chip logic design area 300 partitioned into bins 301. A portion of a logic design is shown wherein isolate cells have been inserted according to the invention. Source cell 302 is coupled via net 303 to sink cells 304 and 305, via net 306 to sink cells 307 and 308, and via net 309 to sink cell 310. As can be seen from FIG. 3, nets 303 and 306 are long compared to net 309, and thus represent a significant capacitive load. Accordingly, isolate cells 311 and 312 have been inserted into nets 303 and 306, respectively, while no isolate cell has been inserted into net 309.

Figure 4:
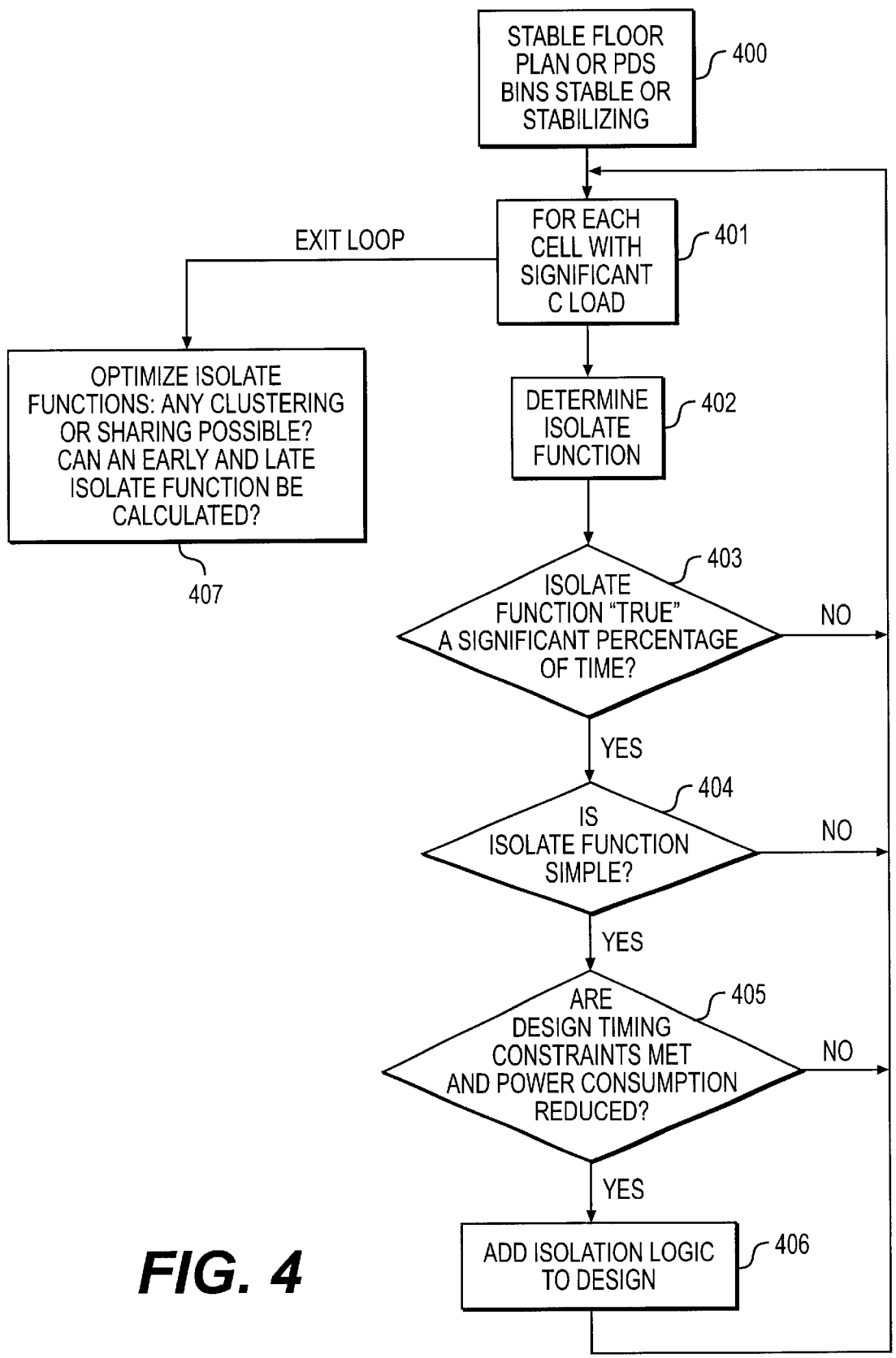
FIG. 4 shows a flowchart illustrating method steps of the invention.

FIG. 4 is a flowchart illustrating a process for determining where to insert isolate cells in a logic design, and for determining isolate functions for controlling the isolate cells. As shown in block 400, the process may begin when a stable floor plan is arrived at. A "floor plan" is an assignment of area, shape and location within a chip logic design space to the various design elements. Alternatively, the process may begin when bin size, for bins developed during PDS, is stable or stabilizing.

One possible criterion for when bin size is stable or stabilizing is that with respect to a given bin, all intra-bin nets are too small for beneficial application of the invention. In other words, the benefit of any power savings realized by the introduction of isolation logic into the bin, considering only the intra-bin power usage, would be nullified or even negated by the additional load of the isolation logic introduced into the bin. Thus, one possible objective measure of a stable bin size could be obtained by determining the power consumption of the isolation logic being considered for insertion into a bin. The power consumption determined would be translated into a wire length, which would in turn determine a maximum bin size.

On the other hand, the bins need to be large enough to absorb the additional isolation logic which may be introduced by the method, when power utilization is considered with respect to one or more neighboring bins. This consideration could be used to determine a minimum bin size.

The point at which bin size is stable or stabilizing may depend on the semiconductor technology being used in a particular IC design. The load capacitance experienced by a given source cell varies from technology to technology. For example, in some older CMOS technologies with an $L_{eff}$ (effective channel length) of 2–3 im, the bin stabilization point will be different than will be the case with newer technologies where $L_{eff}$ is on the order of 0.15–0.25 im.

As shown in block 401, once bin size is stable or stabilizing, each source cell within a bin is examined for whether it is subject to a significant capacitive load (Cload) due to a net or nets connecting the source cell to a sink cell or cells in another, different bin or plurality of bins. Along lines discussed earlier, whether a given capacitive load was significant or not could be determined in terms of whether the power savings that would be realized, by inserting isolation circuitry to isolate the source cell from the load, would be greater than the power consumed by the isolation circuitry.

Next, as shown in block 402, using synthesis, an isolate function for the cell is determined. Then, it is determined whether isolate function is "true" (i.e., whether the cell output is a non-observable signal) a significant percentage of the time, as shown in block 403. Whether the percentage is "significant" involves a number of design considerations and may vary from design to design and technology to technology. Thus, a single, fixed value for the percentage would not be useful. One objective criterion for determining whether the percentage is significant would be, along similar lines to those discussed above, whether the demands of isolation circuitry in terms of area, signal propagation delay, power consumption and the like, would nullify or negate any benefit.

If the cell output is not a non-observable signal a significant percentage of the time, the cell is not a suitable candidate for isolation circuitry, and accordingly that cell is bypassed and the next cell is examined.

If the cell output is a non-observable signal a significant percentage of the time, it is determined whether the isolate function is "simple", as shown in block 404. Generally, this refers to a measure of the complexity of a physical implementation of the isolate function, with respect to whether the implementation is practicable. Whether the isolate function is simple depends on a number of design considerations and may vary from design to design and technology. Thus, a single, fixed determination of what constitutes a simple isolate function is not useful. One objective criterion that could be applied to determine whether an isolate function is simple could be, for example, the number of cells and cell interconnections required to implement the isolate function. This criterion, in turn, is related to considerations, along lines discussed above, as to whether the additional demand of the isolation circuitry implementing the isolate function is greater than the power savings realized by isolating the cell from a capacitive wire load.

Further, as discussed above, an isolate function that is a complete function may be impracticable, while a "partial" isolate function may still be able to realize benefits. That is, if the complexity of implementation is too great, it may not be practical to perform isolation for all possible logic combinations for which the output of a particular cell is not observable. On the other hand, a net power savings may still be obtained by implementing, with simpler circuitry, only a subset of all possible logic combinations for which the output of the cell is not observable. Thus, a step represented by block 404 may include returning to step 402, to break down or reduce a complete isolate function to a partial isolate function, and again performing blocks 403–404 to determine whether the partial isolate function is in a non-observable state a significant percentage of the time, and whether a simple partial isolate function can be obtained.

If a simple isolate function is obtained, the process proceeds to block 405. In block 405, the circuits implementing the isolate function are placed in the design, and the design is then tested for whether it still meets timing constraints, and for whether overall power consumption is reduced by the isolate function.

If the timing constraints are not met or power consumption is not reduced, the cell is bypassed and the next cell is examined. If timing constraints are met and power consumption is reduced, the isolation circuits are added to, or left in, the design, as shown in block 406.

Once the isolation logic is placed in the design, optimization of the isolate functions is possible, as shown in block 407. For example, nets with multiple physically clustered sinks should be able to use a single isolation circuit to isolate the entire cluster of sinks, given the right conditions.

Another possible way to optimize the isolation functions is to make them "early rise" and "late fall" as discussed in the following. The timing requirements of the design, with isolation logic added, have been mentioned above. These timing requirements are affected by a net logic transition which ends the net isolation. To reduce power consumption during a cycle in which a net portion is isolated, it is desirable to isolate the net as quickly as possible (before the net transition can occur); i.e., "early rise". To reduce power consumption in the cycle in which the isolation of the net portion is ended, it is desirable to have the net isolation end as late as possible (after the net has reached its final value for the cycle), subject to system timing constraints; i.e., "early fall". One way of achieving these objectives (early rise and late fall) for the isolate function is to compute both early and late versions of the isolate function and ORing them together. The resulting signal will rise when the early version rises and will not fall until the late version falls. This can also help to mask possible low-going glitches in the isolate function. It does not reduce high-going glitches, but these are less critical as long as they do not cause a timing problem, since a transient disabling of a net will not expend extra power, while a transient enabling of the net may.

It is noted that the invention has been described in terms of an isolate function which takes on a single final value during each clock cycle of a design, depending on whether the final value on the net to be isolated is required at selected sinks. But, the same method can be used to transiently isolate a net portion during the middle of a cycle. This can be used to prevent glitches from propagating along the net. In this case the isolate function is false at the beginning and end of the cycle, but goes true for some period in the middle of the cycle. The timing considerations for this signal are the same as those described above.

It has been further noted above that it is desirable for the isolate function to have a high probability of being true (allowing a net portion to be isolated a significant portion of the time). It is also desirable for the isolate function to have a low switching probability. One benefit of a low isolate function switching probability is lower power consumption in the logic generating it. Further, if the signal value on the isolated net has a "temporal self-correlation", a lower switching probability on the isolate function (given the same isolate signal value probability) can also save power on the isolated net portion.

By temporal self-correlation is meant that the signal tends to stay at the same value from cycle to cycle. More precisely, the signal is more likely in any given cycle to have the value it did in the preceding cycle than it is to have the value it did during some arbitrary past cycle. To understand this, it may be observed that power is consumed on a net portion when a) the net is not isolated in the current cycle, and b) the net has the opposite value in this cycle as it did during the previous cycle in which it was not isolated, whether that was the immediately preceding cycle or (due to an intervening period of isolation) a cycle in the distant past.

It may also be observed that a lower switching probability on the isolate function (given the same isolate signal value probability) will mean that the cycles during which the net portion is isolated will tend to be clustered together in time. Thus the lower isolate switching probability means that the non-isolated cycle preceding a given non-isolated cycle is more likely to be the immediately preceding cycle. Due to the temporal self-correlation, this means that the signal is less likely to switch (and therefore consume power) during any given non-isolated cycle.

During the isolation function derivation process, the isolate function having a lower switching probability would be preferred over one having a higher switching probability. During the process of selecting candidates for net isolation, nets which exhibit a "temporal self-correlation" characteristic are preferred to those that do not. Both of these characteristics can be used to aid the isolate function derivation and isolated net candidate selection process. All isolate functions, as well as isolated net selections will be verified with a full power analysis post isolate cell insertion to insure that the inserted isolate cell did indeed reduce the power dissipation of the IC.

Isolating any given net in a design will reduce the switching activity on that net, and will consequently also reduce switching on downstream nets in the output cone of the isolated net. Thus it may be desirable to apply this technique first to those nets which are closest to the IC's inputs and latch outputs, since such application may reduce the benefit of downstream applications will potentially isolate the maximum number of downstream sinks.

FIGS. 5A–5H show a number of different possible implementations of an isolate cell such as cell 101 or 108. In each of FIGS. 5A–5H, the "ENABLE" input of the isolate cell is connected to a gate net/signal, such as the gate net/signal 102 from the isolate function 115 in FIG. 1. "INPUT" corresponds to an input net such 111 from a source cell such as 100, and "OUTPUT" corresponds to an output net such as 111I in FIG. 1.

Figures 5A, 5B, 5C, 5D:
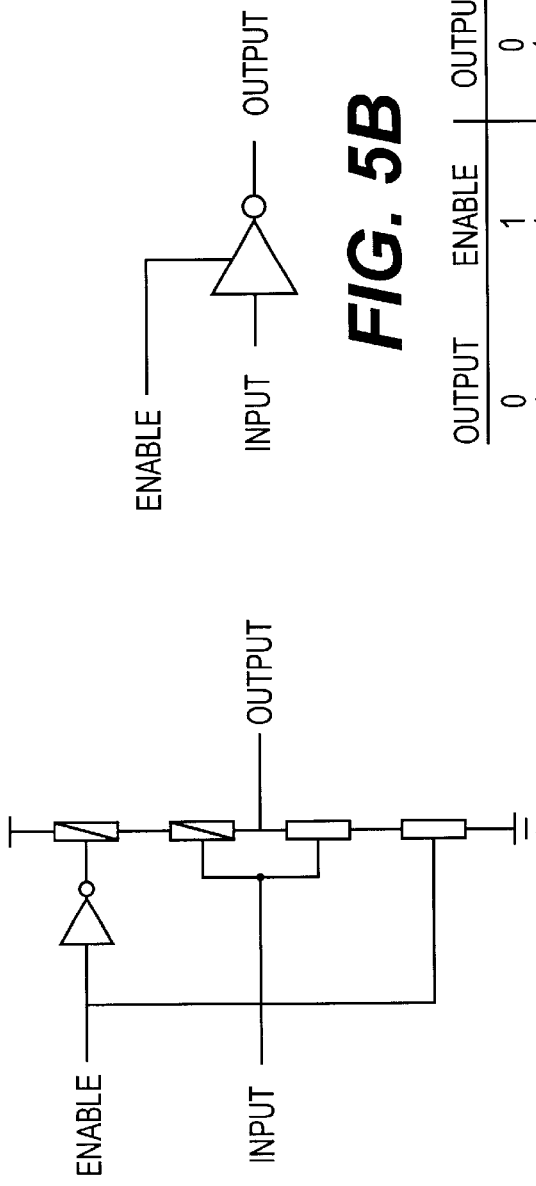
FIGS. 5A–5H show different possible embodiment of isolate cells according to the invention.
Figure 5E:
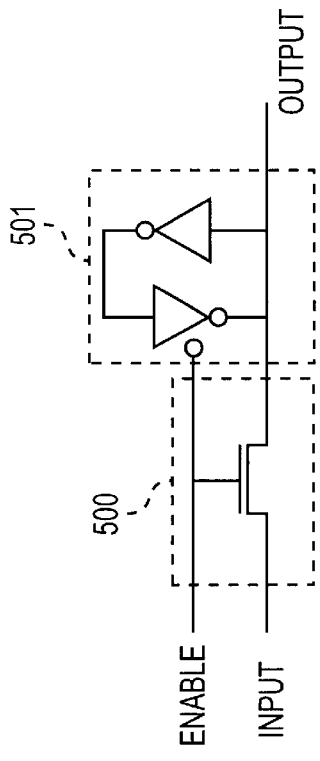
Figure 5F:
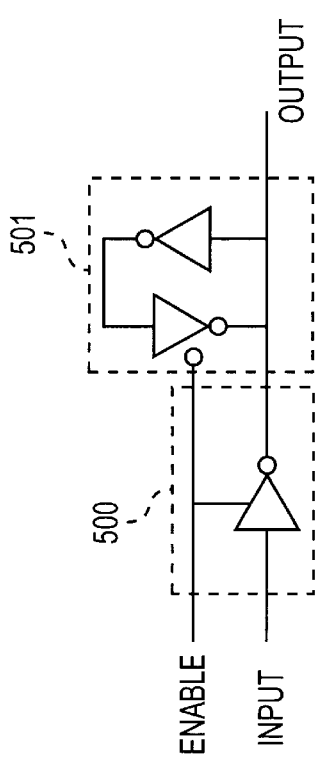
Figure 5G:
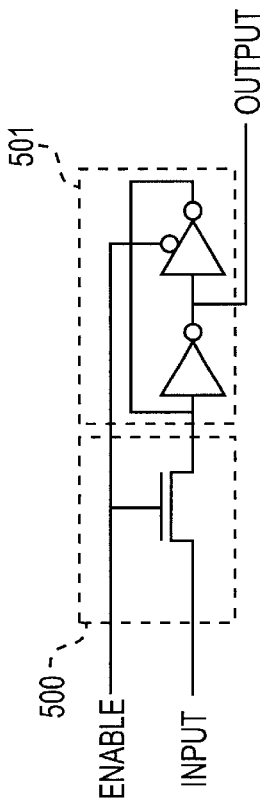
Figure 5H:
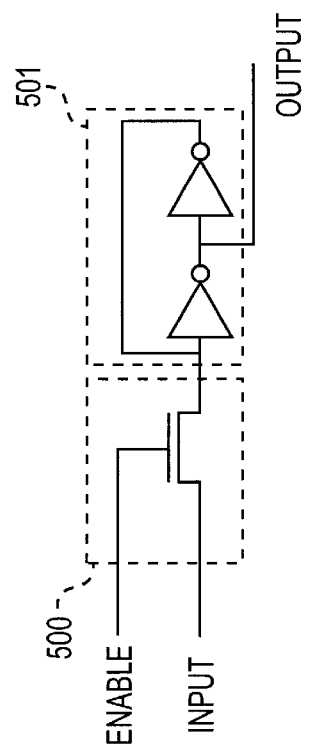

FIG. 5A shows an embodiment of an isolate cell in the form of a well-known "tristate driver" circuit, in a transistor schematic. When the "ENABLE" input is high (a logic '1'), the tristate driver inverts a signal on the "INPUT" net and places the inverted "INPUT" value appears at the "OUTPUT". When the "ENABLE" input is low (a logic '0'), the tristate driver puts "OUTPUT" net in a high impedance state. FIG. 5B shows the equivalent schematic symbol for the circuit of FIG. 5A.

FIGS. 5C and 5D show embodiments of an isolate cell as a pass-gate. The pass-gate places the "OUTPUT" net in a high-impedance state without signal inversion, but without providing signal gain. FIG. 5C shows single NFET pass gate, while FIG. 5D shows a complementary FET pass gate.

FIGS. 5E–5H show embodiments of an isolate circuit which can be characterized in terms of two stages: a stage 500 which places the output net in a high impedance state, and a stage 501 which holds the previous logic state, generated by a source cell, on the isolated net. Holding the previous logic state on the isolated net can be advantageous because it prevents the isolate net from "floating" as described below.

If an embodiment of an isolate cell such as cell 101 or 108 uses a tristate circuit without the hold circuit, undesirable effects may occur which need to be handled. When a source cell is de-coupled from its downstream sink or sinks using high-impedance tristate isolation, the isolated net portion, due to noise and/or leakage current from surrounding circuitry, may float to an intermediate value between the supply voltage of the chip housing the net, and ground. This situation will cause an indeterminate logic state in sink gates that the isolated net is connected to, and consequently will expend current and dissipate power.

Figure 6:
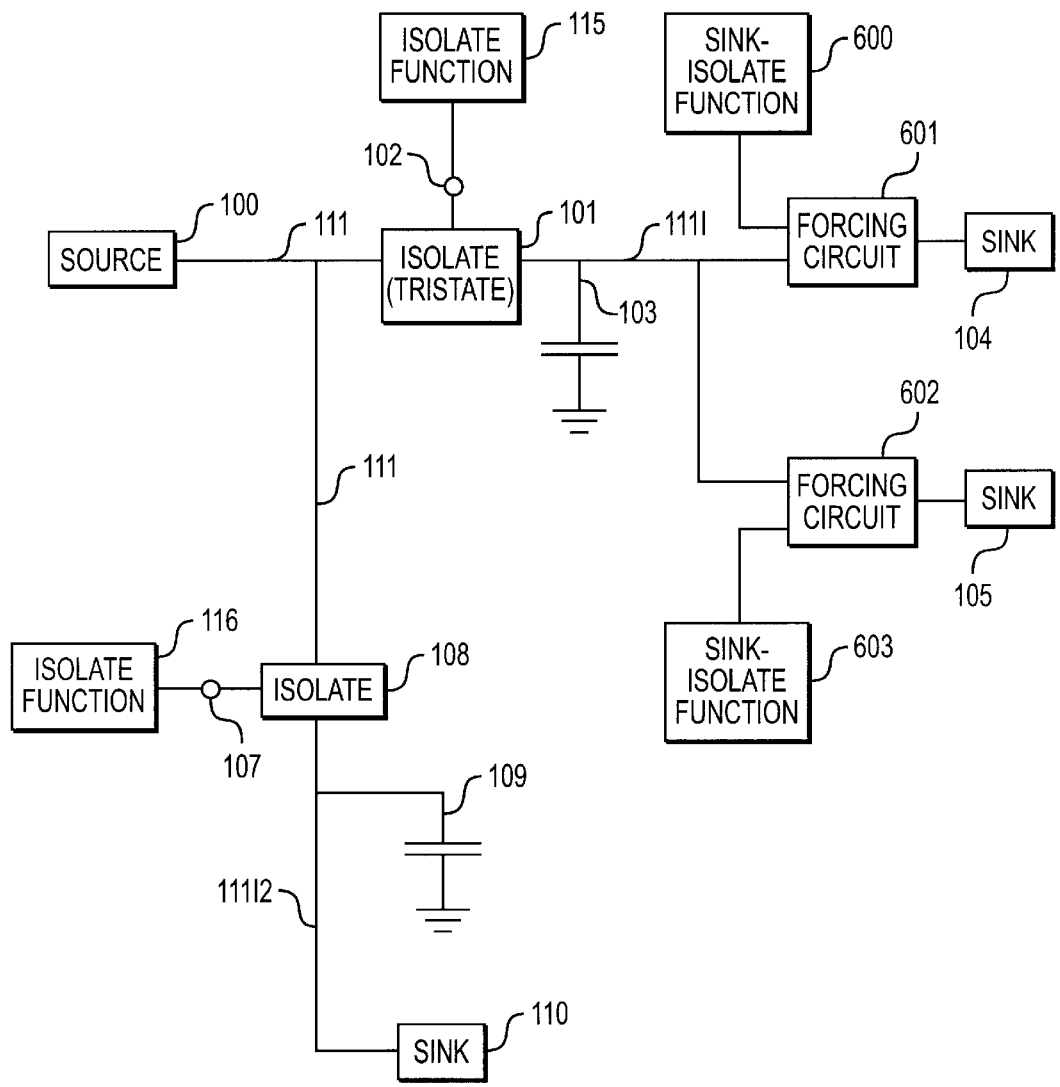
FIG. 6 shows a portion of an IC design including sink-isolate functions and forcing circuits according to the invention.

Accordingly, to prevent the dissipation of power at isolated sinks when tristate isolation is used, forcing circuits in combination with local "sink-isolate" functions may be used. FIG. 6 illustrates an embodiment according to the invention in which isolate cell 101 is implemented with a tristate circuit, and accordingly forcing circuits 601 and 602 have been inserted ahead of sinks 104 and 105, respectively. The isolated net 111I is input to the forcing circuits 601 and 602, along with sink-isolate functions 600 and 603, respectively.

The sink-isolate functions cause the forcing circuits to output a forcing signal which forces the gates of the sinks 104 and 105 to have a determinate logic state when tristate circuit 101 is activated for isolation, thereby preventing power dissipation in the sinks due to signal indeterminacy. Thus, the sink-isolate functions must track or correlate with the isolate function 115, so as to activate the forcing circuits whenever isolation is occurring.

It may be appreciated that although the isolate function itself could be used as the sink-isolate function, this would be self-defeating because of the need to propagate the signal from the isolate function across a long wire to a sink. Accordingly, the sink-isolate function needs to be available from logic which is local to the sink; i.e., in the general physical proximity of the sink. How close the sink-isolate function needs to be to the sink would need to be determined, along lines similar to those discussed above, in terms of a cost/benefit analysis. The sink-isolate function also needs to be "simple" as described above.

Logic synthesis techniques, as described above, can be used to determine when the sink-isolate function should be driving the forcing circuit with respect to the isolate function. If the logic and signals needed to create the sink-isolate function are physically located near the sink, and the sink-isolate function is simple, an isolate circuit which uses a tristate driver may be preferable to circuits such as shown in FIGS. 5E–5H, which both place the net in a high-impedance state and hold the previous logic state. If, for example, a simple sink-isolate function exists, the implementation of the tristate isolate circuit and the sink-isolate function may be less expensive, in terms of power consumption, than the implementation of a "high-impedance-plus-hold" isolate circuit.

Figure 7A:
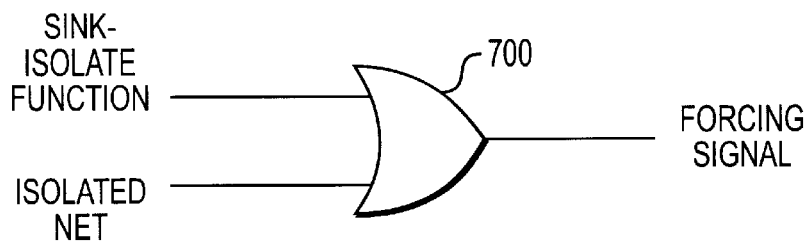
FIGS. 7A–7C show different possible embodiments for the forcing circuits of FIG. 6.
Figure 7B:
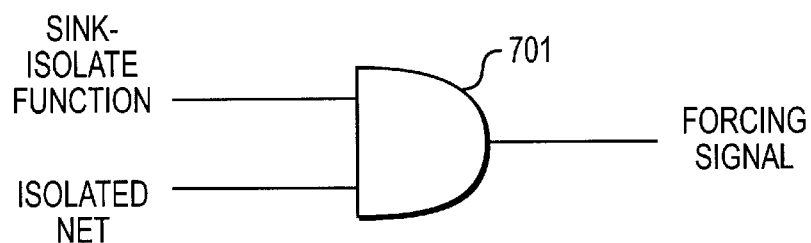
Figure 7C:
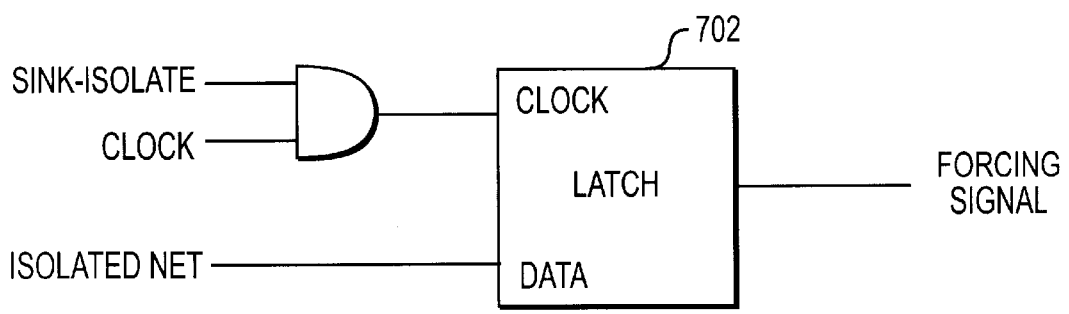

FIGS. 7A–7C show three possible implementations of a forcing circuit such as circuits 601 and 602. The implementation of FIG. 7A uses an OR gate 700 and, accordingly, a sink-isolate function input of logic "1" would cause the forcing signal to be a determinate "1", regardless of the value of the isolated net input.

The implementation of FIG. 7B uses an AND gate 701 and, accordingly, a sink-isolate function input of logic "0" would cause the forcing signal to be a determinate "0", regardless of the value of the isolated net input.

Alternatively, a gated latch 702 could be used as shown in FIG. 7C. Of course, it is generally not significant which of the implementations is used, so long as the forcing signal causes the sink output to be determinate, since during isolation the source signal is non-observable.

As described above, the invention may be implemented within the context of IC design using software, and more particularly, during a process of logic synthesis. Thus, in conceivable embodiments, the invention is implemented in computer-executable instructions which when executed perform method steps of the invention. The instructions may be tangibly embodied in a program module or modules stored on computer-usable media.

Figure 8:
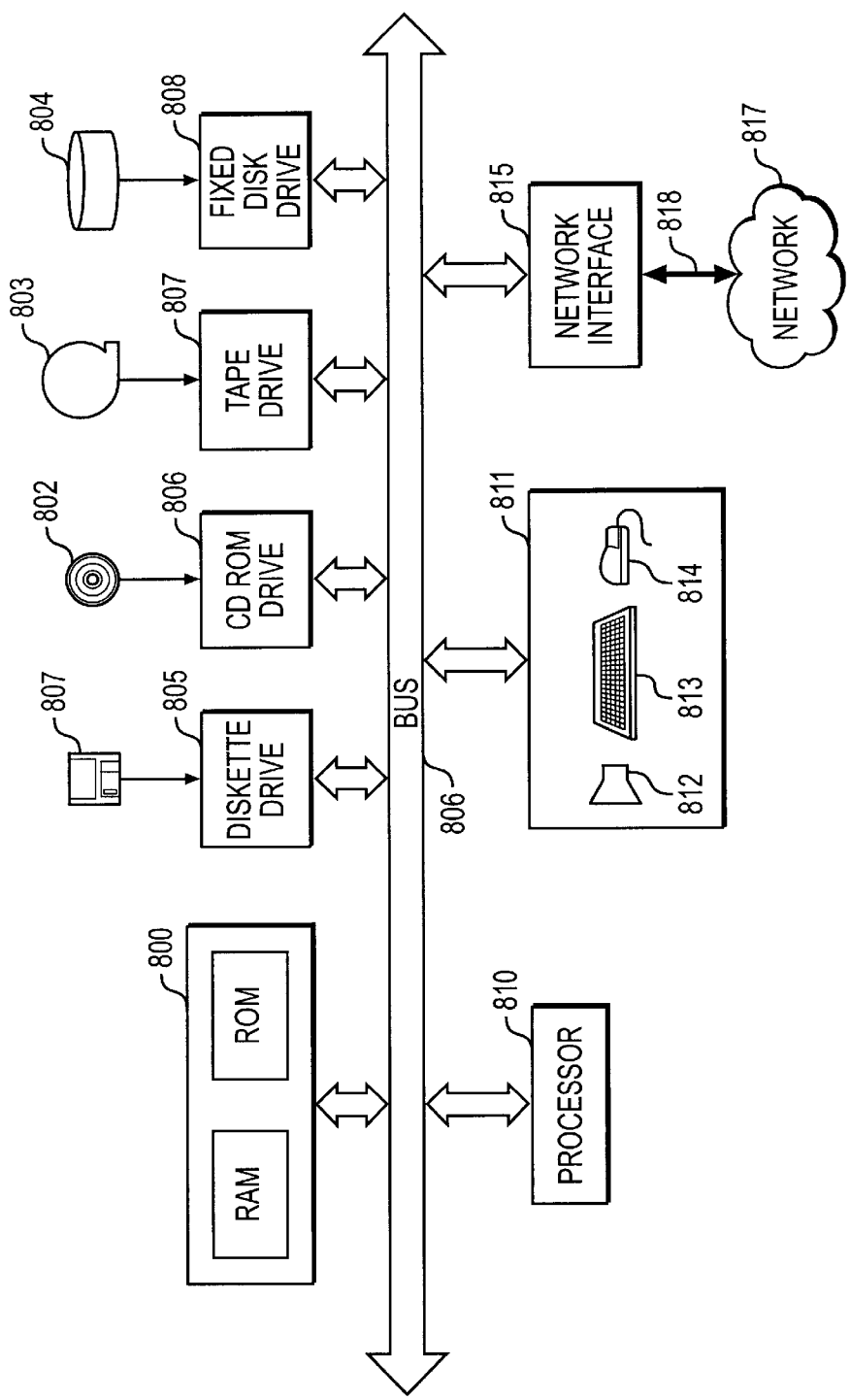
FIG. 8 shows a general purpose computer system for implementing method steps of the invention.

FIG. 8 shows a high-level representation of a computer system for implementing an embodiment of the present invention comprising computer-executable instructions. The computer system might be realized by a variety of known and commercially available hardware and software elements. The system comprises a memory 800 including a ROM and RAM, processor 810 and user interface 811 comprising a video display 812, keyboard 813 and mouse 814. Elements may communicate via system bus 806. The system may further be connected to a network 817 via a network medium 818 and network interface 815.

A computer program or a collection of programs comprising computer-executable instructions for performing method steps according to the present invention may be stored and transported on computer-usable media such as diskette 801, CD-ROM 802, magnetic tape 803 and fixed disk 804. To perform the steps of the method, the instructions may be retrieved from the computer-usable media 801 through 804 using their respective drives 805 through 808 into memory 800 and executed by a processor 810. The method disclosed hereinabove may find specific implementations in a variety of programming structures and data forms, which are considered to be within the abilities of a programmer of ordinary skill in the art after having reviewed the specification.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

The invention claimed is:

1. A method for reducing power consumption in an integrated circuit (IC) including driving cells and driven cells connected by conductive media, comprising the steps of:
   (a) identifying at least one driving cell that generates non-observable signals; and
   (b) de-coupling said at least one driving cell from at least one driven cell when said driving cell generates said non-observable signals by introducing a high impedance between said driving cell and said driven cell whereby said driving cell does not experience a power consuming load from said driven cells.

2. The method of claim 1, said step (b) comprising inserting an isolate cell in a conductive medium connecting said driving cell and said driven cell, said isolate cell de-coupling said driving cell from said driven cell when said driving cell generates said non-observable signals.

3. The method of claim 2, wherein said isolate cell holds a previous logic state of said driving cell.

4. The method of claim 2, further comprising providing an isolate function for controlling said isolate cell, said isolate function generating signals to cause said de-coupling based on a combination of logic whereby a signal generated by said driving cell is non-observable.

5. The method of claim 4, further comprising evaluating said isolation function for complexity of implementation.

6. The method of claim 4, further comprising testing the effect of said isolate function on a timing performance of said IC.

7. The method of claim 4, wherein said isolate function is determined using a placement-driven logic synthesis process.

8. The method of claim 1, comprising providing an isolate function local to said driven cell, said local isolation function controlling a forcing circuit for causing said driven cell to have a determinate logic state when said driven cell is de-coupled from said driving cell.

9. A method for reducing power consumption in an IC design including source cells and sink cells connected by nets, comprising the steps of:

(a) selecting at least one source cell connected to at least one sink cell via a net, for de-coupling said source cell from said sink cell and a portion of said net; and (b) placing an isolate cell in said net between said source cell and said sink cell and portion of said net, to perform said de-coupling by inserting a high impedance which prevents a power consuming load from being applied to said source cell by said sink cell.

10. The method of claim 9, said step (a) further comprising (c) determining whether said source cell is subject to a significant capacitive load.

11. The method of claim 10, wherein step (c) depends on a length of said net.

12. The method of claim 9, said step (a) further comprising determining whether said source cell generates non-observable signals for a significant percentage of time.

13. The method of claim 9, further comprising the step of (d) determining an isolate function for controlling said isolate cell, said isolate function comprising combinations of logic states of cells in logic related to said source cell, said combinations of logic states causing selected signals to be non-observable.

14. The method of claim 13, further comprising the step of (e) determining a probability of said isolate function having a "true" logic state.

15. The method of claim 14, further comprising the steps of:

(f) placing said isolate function into said IC design; and (g) determining whether timing constraints of said design are met and whether a reduction in power dissipation is obtained if said isolation function is present in said design.

16. The method of claim 13, further comprising the step of (h) optimizing said isolate function by using a single isolate cell to isolate multiple physically clustered sinks.

17. The method of claim 13, further comprising the step of (i) optimizing said isolate function by causing said isolate function to de-couple said source cell early in a clock cycle, and end said de-coupling late in said clock cycle.

18. A computer-usable medium tangibly embodying computer-executable instructions, said instructions when executed implementing a process comprising:

(a) identifying at least one cell in an IC design which generates non-observable signals for a significant percentage of time;

(b) determining whether said cell is subject to a significant capacitive load;

(c) determining an isolate function comprising logic combinations which cause said signals to be non-observable;

(d) determining whether said isolate function can be implemented so as to consume less power than said capacitive load;

(e) testing said isolate function within said design to determine whether said design meets timing constraints with said isolate function present; and (f) placing said isolate function within said design depending on the results of steps (b)–(e) to prevent said cell from experiencing a significant capacitive load when producing a non-observable signal.

19. A method for reducing power consumption in an integrated circuit including source cells and sink cells connected by nets, comprising the steps of:

identifying at least one source cell that generates non-observable signals a significant percentage of time;

determining whether said source cell is subject to a significant capacitive load;

determining an isolate function comprising logic combinations which cause said signals to be non-observable;

determining whether said isolate function can be implemented so as to consume less power than said capacitive load;

placing an isolate cell in a net connecting said source cell to at least one sink cell; and using said isolate function to control said isolate cell, to introduce a high impedance into said net to de-couple said source cell from said sink cell when said source cell generates said non-observable signals thereby preventing said source cell from containing power due to a load presented by said capacitive load.

* * * * *